Feb. 16, 1960 — S. I. RICE — 2,924,917
ELECTRO-MAGNETIC CHUCK
Filed Feb. 12, 1957

INVENTORS.
STANLEY I. RICE
BY *Dike, Thompson & Sanborn*
ATTORNEYS

United States Patent Office
2,924,917
Patented Feb. 16, 1960

2,924,917

ELECTRO-MAGNETIC CHUCK

Stanley I. Rice, Worcester, Mass., assignor to The Heald Machine Company, Worcester, Mass., a corporation of Delaware Application February 12, 1957, Serial No. 639,762

1 Claim. (Cl. 51—237)

This invention relates to rotary electro-magnetic chucks and back plates, more particularly for use in internal grinding machines, and has to do with an improvement of the invention covered in U.S. Patent No. 2,787,784, issued April 9, 1957, to Harold L. Blood and Stanley I. Rice, granted on co-pending application Serial No. 497,692, filed March 29, 1955.

In the adaptation of an electro-magnetic chuck for use as a back plate for supporting and rotating a round workpiece on a centerless support while grinding one of its surfaces, several serious obstacles have been encountered. One is that in order to obtain enough holding power in the rotating work engaging surface of the chuck it has previously been found necessary to rotate the electromagnetic coil with its core pieces and to use slip rings and brushes for supplying current to the coil. Since grinding is usually done wet, the grinding fluid and the particles produced by grinding, work their way into the contact surfaces of the slip rings and cause at least momentary loss of electric contact and demagnetization of the chuck. This results in displacement of the workpiece when the chuck loses its grip. Even a momentary interruption or reduction of the current flow of the order of a fraction of a second may allow movement of the workpiece of $\frac{1}{1000}$ of an inch or less which may be sufficient to spoil the workpiece.

Another obstacle is that the work engaging surface of a back plate used in grinding the average round workpiece, for instance, a bearing race, has a comparatively small diameter because the workpiece is small. It is therefore difficult to arrange an electro-magnetic coil and the core pieces for it, for use with such a work engaging face which is small enough to be adapted and at the same time has sufficient holding power to be useful.

Another obstacle has been the necessity for interchangeability of backplates according to the size of workpiece to be ground. It is expensive and time consuming to have to use different machines or to have to do considerable work on one machine in order to be able to grind different sizes of workpieces.

Accordingly, it is among the principal objects of the present invention to overcome the above obstacles.

Since the machines are used to grind workpieces of various sizes, it is desirable to provide an electro-magnetic chuck which is readily adaptable by interchange of parts for the grinding of various sizes and shapes of workpieces without complete disassembly and removal of all of the parts of the chuck. Accordingly, the invention provides an electro-magnetic chuck or back plate for use particularly in internal grinding machines which can be quickly taken apart for cleaning and in which operative parts are easily exchanged for other parts of different sizes, for grinding small workpieces of various sizes and shapes. Accordingly, I provide my electro-magnetic chuck with a plurality of interchangeable nose pieces having work-engaging surfaces of different sizes and I am thereby enabled to engage work pieces of different dimensions with nose pieces of different sizes yielding optimum holding actions during the grinding operations.

The accomplishment of these and other objects is described herein in connection with the drawings in which.

Figures 1, 2, 3:
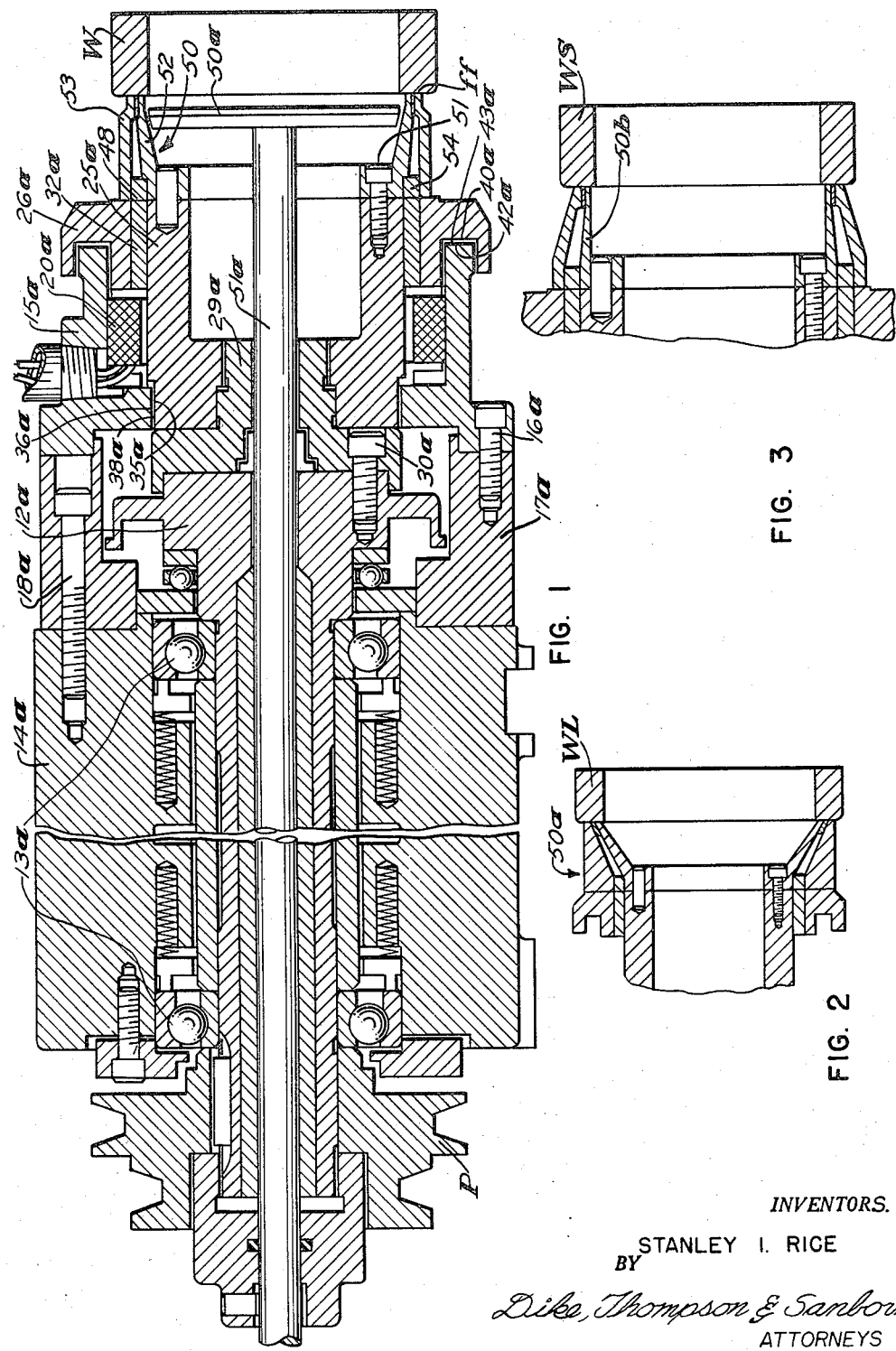
Fig. 1 is an elevation mostly in longitudinal section through the spindle axis in a modification of the invention.
Figs. 2 and 3 are partial views similar to Fig. 1 showing interchangeable parts for accommodating various sizes of workpieces.

Figs. 1–3 show an embodiment of the invention in which a spindle 12a is supported in bearings 13a in a support 14a and may be driven by a pulley P attached at its left-hand end by suitable means including a belt and a drive motor not shown. A housing 15a which supports an annularly shaped electro-magnetic coil 20a therein is attached as by screws 16a to a non-magnetic separator ring 17a which in turn is attached by screws 18a to the support 14a. An inner core portion 25a is attached by suitable means to a magnetic separator 29a which in turn, is attached as by screws 30a to the spindle 12a and the core portion 25a has an outer portion 35a in close proximity to an inner portion 36a of the housing 15a forming a gap 38a therebetween. An outer core portion 26a is supported on the inner core portion 25a by a magnetic separator 32a therebetween. It has a surface 40a in close proximity to a surface 42a of the housing 15a forming a gap 43a therebetween and which has a labyrinthine configuration to help keep out dirt. The inner and outer core portions 25a and 26a terminate at a face 48 normal to the axis of the spindle 12a.

A nose piece 50 is removably attached as by screws 51 to the face 48. The nose piece 50 has corresponding concentric magnetically separated inner and outer magnetizable portions 52 and 53 respectively joined together by a magnetic isolator 54 and is arranged so that the inner and outer magnetizable portions 52 and 53 make contact with the respective inner and outer core portions 25a and 26a. The magnetizable core portions 52 and 53 of the nose piece may taper in section and converge together to the right as seen in Fig. 1 and they terminate in a plane normal to the spindle axis thus forming a circular work-engaging face ff. The nose piece 50 is thus removable by loosening the screws 51 and replaceable with a nose piece having a work-engaging face of a different diameter for accommodating a different size workpiece.

Fig. 2 shows a nose piece 50a which diverges outwardly radially from its axis as compared to the nose piece 50, thereby to accommodate a workpiece WL which is larger than the workpiece W shown in Fig. 3.

Fig. 3 shows a nose piece 50b which converges inwardly to the right to accommodate a workpiece WS which is smaller than the workpiece shown in Fig. 3. Figs. 2 and 3 illustrate the inter-changeability of nose pieces 50, 50a and 50b of various sizes without disturbing other parts of the magnetic chuck of the invention.

The parts of the chuck of Figs. 1–3 are hollow axially thus to accommodate a plug gage 50a and its gage rod 51a.

I claim:

An electromagnetic chuck comprising in combination a stationary head, a spindle mounted in said head for rotation about an axis, a two-part chuck assembly having a first part including a stationary annular coil fixed with said head concentrically about said axis, a three-part magnetizable core structure encircling and protectively enclosing said coil at each angular position about the periphery thereof, said core structure comprising in encircling series magnetic circuit relationship about said coil a stationary core member fixed with said head and a pair of rotatable core members mounted for rotation with said spindle about said axis, said rotatable core members each being separated from said stationary core member by a small air gap and being magnetically separated from each other across an annular gap of uniform radial thickness terminating with said rotatable core members in a plane face which is perpendicular to said axis and is axially displaced away from said head, coil and air gaps at one extremity of said first part of said assembly, non-magnetizable material closing said annular gap and terminating in said plane face, whereby the small gaps and said non-magnetizable material preserve said first part of said assembly substantially closed against contaminants, and an elongated work engaging nose piece dimensioned to form a second part of said chuck assembly and having a pair of radially spaced concentric inner and outer elongated annular members of magnetizable material, the corresponding ends of which are coplanar, non-magnetizable material separating said nose piece members and terminating coplanar with said ends to close said ends against entry of foreign particles between said nose piece members, the concentric magnetizable nose piece members having at one end thereof substantially the same radial spacing as said annular gap to permit radial alignment of said magnetizable nose piece members and rotatable core members when said one end of said nose piece is in contact with said plane face, means for fastening said nose piece removably to said first part of said chuck assembly with said one end of said nose piece in contact with said plane face of said first part and with said magnetizable nose piece members and rotatable members in radial alignment, whereby said nose piece may be fastened to and removed from said first part of said chuck assembly for replacement by another nose piece to hold work pieces of different diameters at said other ends thereof in axially displaced relationship to said air gaps without dismantling said first part and disturbing said small air gaps.

References Cited in the file of this patent

UNITED STATES PATENTS

| | | |
|---|---|---|
| 1,105,552 | Downes | July 28, 1914 |
| 2,741,481 | Ortegren | Apr. 10, 1956 |
| 2,787,874 | Blood et al. | Apr. 9, 1957 |